United States Patent
Gaddam et al.

(10) Patent No.: US 9,015,021 B2
(45) Date of Patent: Apr. 21, 2015

(54) MULTIPLE CLIENT SIMULATOR FOR PUSH ENGINE

(75) Inventors: Venkat Gaddam, Bridgewater, NJ (US); Shahid Ahmed, Monmouth Junction, NJ (US); Sankar Shanmugam, Dayton, NJ (US); Peter Kyagaba Kisuule, Elyria, OH (US)

(73) Assignee: Cellco Partnership, Basking Ridge, NJ (US)

( * ) Notice: Subject to any disclaimer, the term of this patent is extended or adjusted under 35 U.S.C. 154(b) by 610 days.

(21) Appl. No.: 13/281,159

(22) Filed: Oct. 25, 2011

(65) Prior Publication Data

US 2013/0103376 A1    Apr. 25, 2013

(51) Int. Cl.
*G06F 17/50* (2006.01)
*H04L 12/24* (2006.01)
*H04L 12/58* (2006.01)
*H04L 29/08* (2006.01)
*G06Q 20/10* (2012.01)

(52) U.S. Cl.
CPC ........... *H04L 41/069* (2013.01); *H04L 12/5895* (2013.01); *H04L 2209/80* (2013.01); *H04L 67/14* (2013.01); *G06Q 20/102* (2013.01); *H04L 67/26* (2013.01); *H04L 41/145* (2013.01)

(58) Field of Classification Search
None
See application file for complete search history.

(56) References Cited

U.S. PATENT DOCUMENTS

| | | | |
|---|---|---|---|
| 6,061,349 A * | 5/2000 | Coile et al. | 370/389 |
| 6,104,717 A * | 8/2000 | Coile et al. | 370/401 |
| 6,108,309 A * | 8/2000 | Cohoe et al. | 370/241 |
| 6,366,558 B1 * | 4/2002 | Howes et al. | 370/219 |
| 6,415,313 B1 * | 7/2002 | Yamada et al. | 709/200 |
| 6,445,704 B1 * | 9/2002 | Howes et al. | 370/392 |
| 6,609,159 B1 * | 8/2003 | Dukach et al. | 719/331 |
| 6,886,169 B2 * | 4/2005 | Wei | 719/316 |
| 6,901,357 B1 * | 5/2005 | Patiejunas | 703/14 |
| 7,006,467 B2 * | 2/2006 | Anton et al. | 370/329 |
| 7,251,816 B2 * | 7/2007 | Jones | 719/328 |
| 7,257,837 B2 * | 8/2007 | Xu et al. | 726/12 |
| 7,313,635 B1 * | 12/2007 | Zavalkovsky | 709/248 |
| 7,561,899 B2 * | 7/2009 | Lee | 455/566 |
| 7,774,505 B2 * | 8/2010 | Kang et al. | 709/249 |
| 7,917,653 B2 * | 3/2011 | So | 709/248 |
| 7,958,247 B2 * | 6/2011 | Abu-Samaha et al. | 709/228 |
| 8,082,224 B2 * | 12/2011 | Marinescu | 707/617 |
| 8,244,887 B2 * | 8/2012 | Abu-Samaha et al. | 709/228 |
| 8,335,742 B2 * | 12/2012 | McIver et al. | 705/39 |
| 8,356,084 B2 * | 1/2013 | Yamamoto | 709/219 |
| 8,356,353 B2 * | 1/2013 | Futoransky et al. | 726/25 |
| 8,401,029 B2 * | 3/2013 | Luo et al. | 370/401 |
| 8,447,739 B2 * | 5/2013 | Naibo et al. | 707/688 |
| 8,732,810 B2 * | 5/2014 | Gaddam et al. | 726/7 |
| 8,914,449 B2 * | 12/2014 | Gaddam et al. | 709/206 |
| 8,914,473 B2 * | 12/2014 | Clark et al. | 709/219 |
| 2002/0112071 A1 * | 8/2002 | Kim | 709/238 |
| 2003/0028671 A1 * | 2/2003 | Mehta et al. | 709/245 |
| 2003/0046383 A1 * | 3/2003 | Lee et al. | 709/224 |
| 2003/0202486 A1 * | 10/2003 | Anton et al. | 370/329 |

(Continued)

*Primary Examiner* — Kibrom K Gebresilassie (57) ABSTRACT

A single computer may be configured to function as a multiple client simulator that tests a push engine by simultaneously simulating multiple clients. The multiple client simulator may be configured to open and simultaneously maintain a large number of connections with the push engine. To facilitate this, a virtual interface module may be used to multiply the effective number of IP addresses of the single computer. The default number of ports that are available for each IP address may also be increased, along with the available number of file descriptors.

21 Claims, 3 Drawing Sheets

(56) References Cited

U.S. PATENT DOCUMENTS

| | | | |
|---|---|---|---|
| 2003/0206192 A1* | 11/2003 | Chen et al. | 345/733 |
| 2004/0073643 A1* | 4/2004 | Hayes et al. | 709/223 |
| 2004/0153468 A1* | 8/2004 | Paila et al. | 707/101 |
| 2004/0166834 A1* | 8/2004 | Omar et al. | 455/414.1 |
| 2005/0176423 A1* | 8/2005 | Park et al. | 455/428 |
| 2005/0176473 A1* | 8/2005 | Melpignano | 455/574 |
| 2006/0019749 A1* | 1/2006 | Merati et al. | 463/42 |
| 2006/0039388 A1* | 2/2006 | Shur et al. | 370/401 |
| 2006/0156256 A1* | 7/2006 | Lee | 715/857 |
| 2006/0200596 A1* | 9/2006 | So | 710/38 |
| 2006/0259957 A1* | 11/2006 | Tam et al. | 726/3 |
| 2007/0088822 A1* | 4/2007 | Coile et al. | 709/224 |
| 2007/0255953 A1* | 11/2007 | Peyret | 713/168 |
| 2008/0040441 A1* | 2/2008 | Maes | 709/207 |
| 2008/0212616 A1* | 9/2008 | Augustine et al. | 370/503 |
| 2009/0063626 A1* | 3/2009 | Nakagawa et al. | 709/203 |
| 2009/0171669 A1* | 7/2009 | Engelsma et al. | 704/275 |
| 2009/0300162 A1* | 12/2009 | Demarie et al. | 709/224 |
| 2009/0327354 A1* | 12/2009 | Resnick et al. | 707/201 |
| 2010/0017384 A1* | 1/2010 | Marinescu | 707/5 |
| 2010/0094891 A1* | 4/2010 | Noyes et al. | 707/759 |
| 2010/0094985 A1* | 4/2010 | Abu-Samaha et al. | 709/223 |
| 2010/0185999 A1* | 7/2010 | Graur et al. | 716/20 |
| 2010/0211599 A1* | 8/2010 | Cao | 707/769 |
| 2010/0211861 A1* | 8/2010 | Onda et al. | 715/205 |
| 2010/0238503 A1* | 9/2010 | Sakuda et al. | 358/1.15 |
| 2010/0312870 A1* | 12/2010 | Kennedy et al. | 709/223 |
| 2011/0110333 A1* | 5/2011 | Chen | 370/331 |
| 2011/0201304 A1* | 8/2011 | Sutaria et al. | 455/408 |
| 2011/0208869 A1* | 8/2011 | Abu-Samaha et al. | 709/228 |
| 2011/0295978 A1* | 12/2011 | Pazos et al. | 709/219 |
| 2011/0314462 A1* | 12/2011 | Clark et al. | 717/169 |
| 2012/0102173 A1* | 4/2012 | Slavitch et al. | 709/223 |
| 2012/0110329 A1* | 5/2012 | Brown et al. | 713/168 |
| 2012/0166286 A1* | 6/2012 | Schuster et al. | 705/14.64 |
| 2013/0103376 A1* | 4/2013 | Gaddam et al. | 703/13 |
| 2013/0111043 A1* | 5/2013 | McGuire | 709/228 |
| 2013/0117382 A1* | 5/2013 | Gaddam et al. | 709/206 |
| 2013/0312065 A1* | 11/2013 | Abeyweera | 726/3 |

* cited by examiner

MULTIPLE CLIENT SIMULATOR FOR PUSH ENGINE

BACKGROUND

1. Technical Field

This disclosure relates to push technology, wireless mobile network communications, messaging systems, and push technology test equipment.

2. Description of Related Art

Push technology can be used to communicate data, such as messages and billing information, over a computer network, such as a wireless mobile network communication system.

To facilitate these communications, a long-term connection may be established between a push engine and each client that may receive the data, such as each cellphone that is active on the wireless mobile network communication system. A back-end system, such as a back-end billing system and/or a back-end messaging system, may deliver data to the push engine that is designated for delivery to one of the clients. In turn, the push engine may deliver this data to the client over the open connection that it has established with this client.

It may be helpful to test a push engine to determine how many connections it can simultaneously maintain, how much bandwidth it can provide to transfer data, and/or other performance characteristics. Unfortunately, the test may require the simulation and use of over one million simultaneous connections. In turn, this may require a large number of client computers to be devoted to the test, a large array of test harnesses, and a large room to house all of this equipment. This can make the testing very expensive and impractical. A more practical and inexpensive way to test a push engine is needed.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
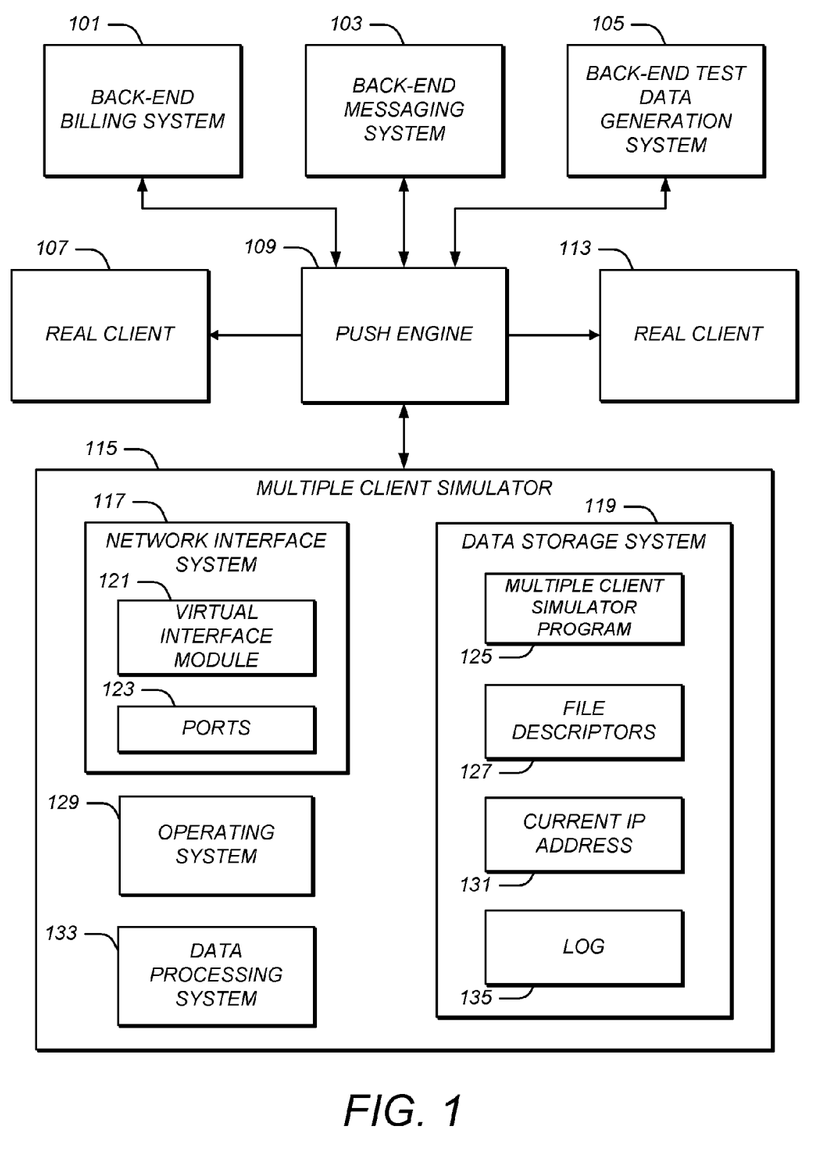
FIG. 1 illustrates a computer network system that includes multiple back-end systems, a push engine, and a multiple client simulator.

FIG. 1 illustrates a computer network system that includes multiple back-end systems 101, 103, and 105, a push engine 109, a multiple client simulator 115, and real clients 107 and 113.

Each real client is configured to open a long-term connection with the push engine 109. This may be done, for example, by opening a socket and keeping it open. A connection is deemed to be "long-term" if it is used to send and receive data over a period of at least ten minutes, such as more than one hour, several hours, or even days. A short-term connection has a shorter life and is typically used to send data, receive an acknowledgment, and then close. Its duration typically ranges from a few milliseconds to a few seconds.

While these connections are open, the push engine 109 is configured to receive instances of data from one or more of the back-end systems that are designated to be delivered to one of the real clients. In turn, the push engine 109 delivers each instance of received data to its designated client over the open connection that has been established with this client. The data may be delivered over a computer network system, such as the Internet, a cellular network, a LAN, a WAN, or any combination of these.

The real clients may be of any type. For example, the real clients may be a cell phone, smart cell phone, laptop computer, tablet computer, desktop computer, or any other type of computer-based client. Each real client may include one or more messaging applications that are configured to receive messages and to communicate them to a user of the client. Each client may contain one or more other types of applications that are configured to receive other types of data. The number of real clients may be substantially larger than what is illustrated, such as about 100,000, 500,000, 1,000,000, or even more.

One example of a system that normally pushes data to clients is a back-end billing system 101. The back-end billing system 101 is configured to deliver various types of billing messages to the clients through the push engine 109. Examples of these messages include that the bill is ready for viewing, warnings about pre-set account thresholds being hit, confirmation of payments received, and re-connections and disconnections of service.

Similarly, the back-end messaging system 103 is configured to deliver various messages to the clients through the push engine 109. For example, these may be messages sent by one client and designated for another client. Other examples of various messages provided by the back-end messaging system 103 include instant messaging messages, stock price updates, incremental weather warnings, personal data management (e.g., contact info, calendar events), application delivery, location delivery, streaming video, and audio.

There may be other types of back-end systems that deliver other types of data to the push engine 109 that are also designated for delivery to the clients. Examples of such systems include private and public portals, which deliver data such as alerts (e.g., traffic alerts, system alerts, and inventory alerts) to the push engine 109.

What has thus-far been described is the normal operation of the push engine 109 and its associated real clients and back-end systems. As indicated above, however, it may be desirable to test the push engine 109 in a production-like environment, to determine how well it is working, including how many connections it can simultaneously maintain and/or what overall bandwidth it can provide for all of the data coming from the back-end systems. This testing may be performed periodically, in accordance with a maintenance schedule, after an upgrade or other configuration change, after a repair, or for any other reason.

The multiple client simulator 115 and the back-end data generation system 105 are configured to facilitate this testing and, in particular, to simulate the near simultaneous delivery of data to multiple clients. The number of simulated clients may be more than 100,000, 500,000, or 1,000,000.

The multiple client simulator 115 includes a network interface system 117, a data storage system 119, an operating system 129, and a data processing system 133.

The data processing system 133 is configured to open and simultaneously maintain a long-term connection with the push engine 109 through the network interface system 117 for each client that is simulated by the multiple client simulator 115. The opening of each connection may be accomplished, for example, by establishing a TCP/IP connection to the push engine 109.

Each connection may be assigned a unique combination of an IP address and a port. The number of simulated clients may be any amount up to the total number of IP addresses that are available, multiplied by the total number of ports that are available for each IP address.

The multiple client simulator 115 may be implemented by a single computer which may or may not have multiple processors within it. This single computer may be connected to the computer network system that is illustrated in FIG. 1 using only a single actual IP address. The multiple client simulator 115 may instead be implemented by multiple computers at the same or different locations and/or with multiple actual IP addresses. Multiple actual IP addresses may be used when a single actual IP address is not enough to support all of the desired client simulations.

To enhance the number of connections that can be simultaneously maintained by the multiple client simulator 115, and thus the number of clients that it can simulate, the network interface system 117 includes a virtual interface module 121 that is configured to simulate virtual IP addresses using only a single actual IP address. (Unless otherwise indicated, both actual and virtual IP addresses are both referred to herein as IP addresses.) The virtual IP interface module 121 may be configured to do so by defining sub-interfaces on the local TCP/IP interface. Any number of virtual IP addresses may be simulated. That number, for example, may be between 1 and 256.

Each IP address typically has a certain number of ports that are each available for making a connection, such as 65,536 (64 k). However, the operating system 129 may be configured to reserve a large number of these ports (e.g., half) for its own use, leaving only the remaining ports available for making connections to the push engine 109. The number of available ports may therefore be less than 35 k.

The number of ports that the operating system 129 reserves for itself can usually be reduced by changing a user-configurable setting that the operating system 129 provides. To increase the number of connections that may be made in connection with each IP address, the number of ports that are available for the applications to use may be increased, such as to 56K. The number of available ports may therefore be increased to more than 50 k.

Each connection may be a TCP/IP connection. HTTP or HTTPS may be used as the communication protocol and transfer coding may be set to "chunked" to facilitate the long-term connection. Using "chunked" transfer encoding, the TCP/IP connection is NOT closed after a transmission. Each data transmission is preceded by its length so the receiver can determine the end of data and not depend on end of transmission.

The TCP/IP stack used in data communication may also be tuned. Specifically, the number of buffers that form the TCP/IP stack and the size of the buffers used to transmit and receive data may be increased to support the needed traffic. When the operating system 129 is Solaris 10, for example, the following tuning adjustments may be made:

transmit buffer (tcp_xmit_hiwait)=983040
receive buffer (tcp_rec_vhiwait)=983040
maximum buffer size (tcp_max_buf)=4194304

The data storage system 119 may store file descriptors 127. Each connection that is established may require a file descriptor to keep track of opened files and established connections. The operating system 129 may, by default, limit the number of file descriptors. A typical system may require fewer than the default number of file descriptors. However, to load test simultaneous connections may require an increase in the number of file descriptors. If so, a user-configurable setting in the operating system 129 may usually be changed to increase the number of file descriptors to the number of connections needed for the simulation, as well as a predetermined allowance for file descriptors needed by the system and other applications. This increased number may be very large, such as 3,000,000) or it may be set to "unlimited."

The data storage system 119 includes a multiple client simulator program 125. This is a software program that is configured to cause the virtual interface module 121 and the data processing system 133 to perform the functions that are described herein.

Through the use of the virtual interface module 121 and increases in the available number of ports and file descriptors, the multiple client simulator 115 may be able to simultaneously simulate more than 100,000, 500,000, or 1,000,000 clients.

The data storage system 119 also stores a current IP address 131. Initially, this may be set to the first virtual IP address that is made available by the virtual interface module 111.

When opening a connection, the data processing system 133 may communicate with the operating system 129 for the purpose of obtaining the next available port at the current IP address 131. In turn, the operating system 129 may return the number of the next available port at the current IP address 131 to the data processing system 133 which may then proceed to open a connection with the push engine 109 at this IP address and through this port.

Eventually, all available ports at the current IP address 131 may be used for connections to the push engine 109. When this happens, the operating system 129 may communicate to the data processing system 133 that no more ports are available at the current IP address 131. In one embodiment, the maximum number of ports for the current IP address, which include the number of ports in use plus the reserved ports, add up to 64K. When this happens, the data processing system 133 increments the current IP address 131 to the next available virtual IP address. For each available port, the data processing system checks to see if it is already in use. If it is in use, then it increments to the next port until the 64K limit is reached. This process of opening connections may continue until all available virtual IP addresses and ports within them are used up. In other embodiments, the next port can be selected in another manner as desired, such as randomly.

When opening a connection, the data processing system 133 may be configured to cause authentication information to be delivered to the push engine 109. The authentication information is indicative of the authenticity of the client that the multiple client simulator 115 is simulating. Any type of authentication information may be sent. For example, the authentication information may include a unique mobile device number (MDN) for the client that the multiple client simulator 115 is simulating. It may also include an IP address of the client that the multiple client simulator 115 is simulating, such as the current IP address 131.

The data processing system 133 may not be successful in opening every connection that it seeks to open. For example, the push engine 109 may simply not have the capacity to open an additional connection. If the attempt to open a connection fails, the data processing system 133 may log this failure in a log 135 in the data storage system 119, along with the time of the failure.

The push engine 109 is similarly configured with a virtual interface module so as to enable the push engine 109 to utilize multiple virtual IP addresses when opening connections with the multiple client simulator 115. The push engine 109 may similarly have its operating system adjusted to increase the number of available ports at each IP address and the number of available file descriptors through appropriate user adjustments of operating system parameters. The push engine 109 may similarly have its TCP/IP stack tuned to enhance its performance, again through appropriate adjustments of operating system parameters.

The back-end test data generation system 105 is configured to generate test instances of data that are designated for each of the clients that are simulated by the multiple client simulator 115. Unlike real instances of data, in which the type of data is limited to the data source, the test instances of data may be of any type, such as short or long messages or streaming audio or video or both. The data type of the test instances of data may be selected so as to cycle through the different data types from individual test instance to individual test instance, randomly, in periodic groups of the same data type, or in any manner desired. The back-end test data generation system 105 may be configured to generate the test instances of data periodically, in accordance with a maintenance schedule, or in response to a user command. As with the other back-end systems, the back-end test data generation system 105 is configured to deliver these test instances of data to the push engine 109 for forwarding to the designated clients. The back-end test data generation system 105 may be configured to generate one or multiple instances of test data for each simulated client over any period of time. The time period over which data is sent may be pre-configured or selected by a user of the system.

The network interface system 117 is configured to receive the multiple instances of data from the push engine 109 through the connections that have been established.

The data processing system 133 is configured to log when each instance of data is received by the network interface system 117, along with the identity of the connection through which the instance of data was received. This information is also placed in the log 135. In response to the receipt of each instance of data, the data processing system 133 is also configured to cause the network interface system 117 to send an acknowledgement to the push engine 109 through the data connection through which the instance of data was received.

No instance of data may be received from the back-end test data generation system 105 for delivery to one of the simulated clients for a pre-determined period of time. This may occur, for example, because no such instance has been received by the push engine 109 within this period or because the push engine 109 is too busy to send the instance or otherwise incapable of doing so within this time period. When this happens, the push engine 109 is configured to nevertheless generate and send a unique instance of data to the multiple client simulator 115 over the connection for that simulated client that is representative of a heartbeat. The data processing system 133 is configured to treat each heartbeat in the same way as a data being sent by the back-end data generation system, except that the data processing system 133 is configured to include information in the log 135 indicating that this particular received data was a heartbeat.

At the conclusion of a multiple client simulation, the log 135 will contain information indicating when each instance of data was received, whether the received data was a heartbeat, the connection through which the data was received, and when any attempted connection failed. The data processing system 133 may be configured to compute statistical information about the performance of the push engine 109 based on an aggregate of the information that is in the log 135. For example, the data processing system 133 may compute the number of connections that the push engine can simultaneously maintain and/or a data bandwidth of the push engine 109. The information in the log 135 may instead be sent elsewhere for analysis.

Figure 2:
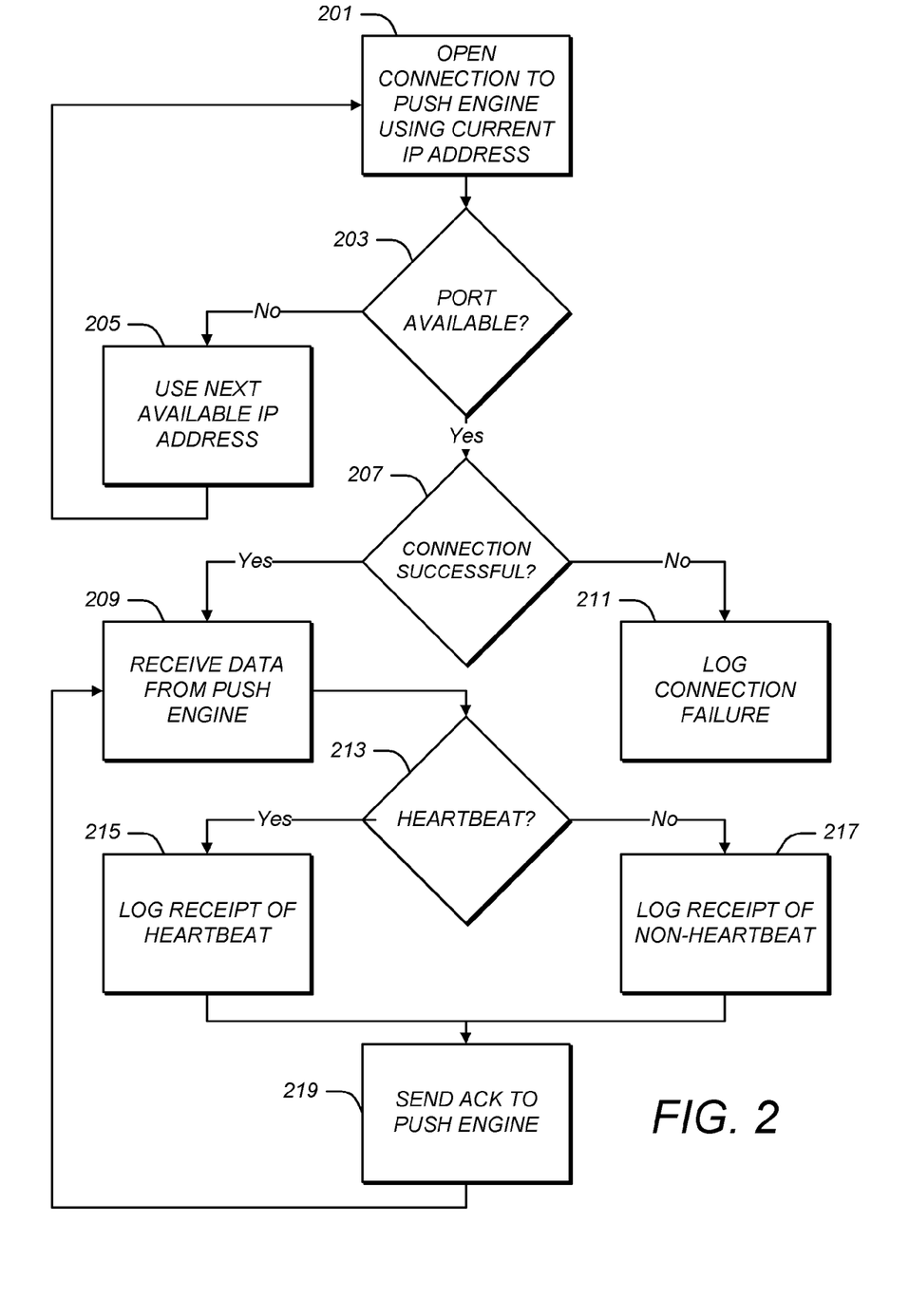
FIG. 2 illustrates a process that may be implemented by the multiple client simulator illustrated in FIG. 1 in connection with each connection that is established between the multiple client simulator and the push engine illustrated in FIG. 1.

FIG. 2 illustrates a process that may be implemented by the multiple client simulator 115 in connection with each connection that is established between the multiple client simulator 115 and the push engine 109 illustrated in FIG. 1. The process illustrated in FIG. 2 may be implemented by a multiple client simulator that is different from the one illustrated in FIG. 1. Similarly, the multiple client simulator 115 that is illustrated in FIG. 1 may implement processes that are different from the one illustrated in FIG. 2.

Figure 3:
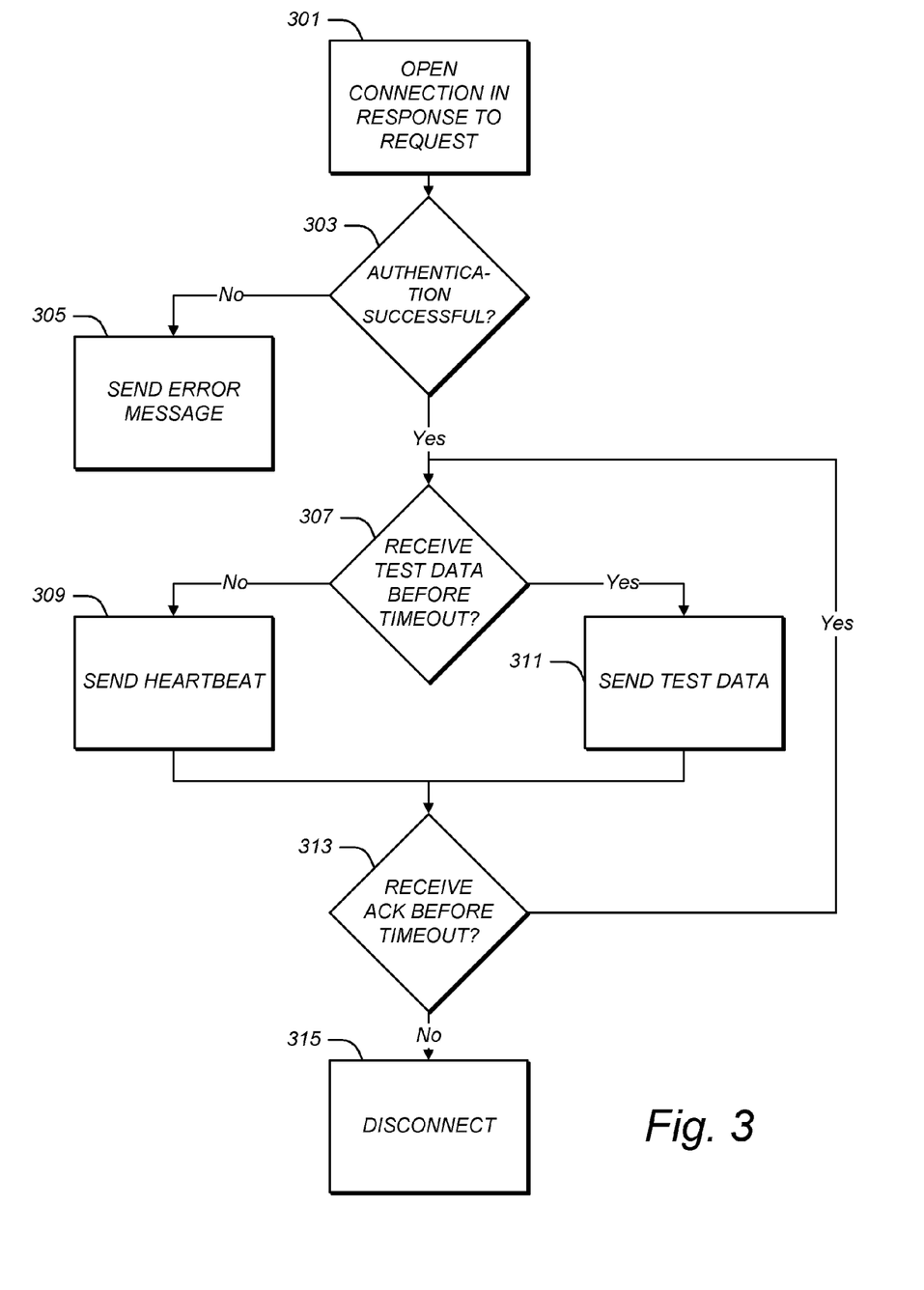
FIG. 3 illustrates a process that may be implemented by the push engine illustrated in FIG. 1 in connection with each connection that is established between the multiple client simulator and the push engine illustrated in FIG. 1.

FIG. 3 illustrates a process that may be implemented by the push engine 109 in connection with each connection that is established between the multiple client simulator 115 and the push engine 109 illustrated in FIG. 1. The process illustrated in FIG. 3 may be implemented by a push engine that is different from the one illustrated in FIG. 1. The push engine 109 illustrated in FIG. 1 may also implement processes that are different from the one illustrated in FIG. 3.

These two flow diagrams graphically illustrate the processes that have been discussed above. A brief recap of them will now be provided. The additional details that are discussed above are part of these process steps, even when not repeated.

The data processing system 133 begins by attempting to open a connection through the push engine 109 using the current IP address 131, as reflected by an Open Connection to Push Engine Using Current IP Address step 201.

The data processing system 133 then learns from the operating system 129 whether a port is available at the current IP address 131, as reflected by a Port Available? decision step 203. If not, the data processing system 133 uses the next available IP address, as reflected by a Use Next Available IP Address step 205.

The push engine 109 opens a connection in response to the request from the multiple client simulator 115 to open the connection, as reflected by a Open Connection In Response to Request step 301.

The push engine 109 analyzes the authentication information that has been provided by the multiple client simulator 115 to determine whether it is valid, as reflected by an Authentication Successful? decision step 303. When an MDN and IP address is provided, for example, the push engine 109 may verify the active status of the clients' account and may verify that the IP address is associated with this MDN by accessing appropriate databases, such as through querying a billing server and/or an AAA server.

If the authentication fails, the push engine 109 sends an error message to the multiple client simulator 115, as reflected by a Send Error Message step 305.

The data processing system 133 checks to see whether the connection was successful, as reflected by a Connection Successful? decision step 207. During this check, for example, the data processing system may conclude that the connection was not successful if it receives an error message sent during the Send Error Message step 305. In this case, the data processing system 133 will log the connection failure, as reflected by a Log Connection Failure step 211.

If the authentication of the simulated client was successful, the push engine 109 will wait a pre-determined period of time for test data designated for the simulated client, as reflected by a Receive Test Data Before Timeout? decision step 307. As indicated above, this test data will come from the back-end test data generation system 105.

If test data is not received before the time out, the push engine 109 sends a heartbeat, as reflected by a Send Heartbeat step 309. If test data is received before the timeout, on the other hand, the push engine 109 instead sends the test data, as reflected by a Send Test Data step 311.

The multiple client simulator 115 receives the data (whether it is the test data or the heartbeat), as reflected by a Received Data from Push Engine step 209. The data processing system 133 then determines whether the received data is a heartbeat, as reflected by a Heartbeat? decision step 213. The data processing system 133 may be configured to make this determination based on whether the received data matches the unique pattern of the heartbeat.

If the received data is a heartbeat, the data processing system 133 logs the receipt of the heartbeat, as reflected by a Log Receipt of Heartbeat step 215. Otherwise, the data processing system 133 logs the receipt of the non-heartbeat data, as reflected by a Log Receipt of Non-Heartbeat step 217.

After the logging, the data processing system 133 causes the network interface system 117 to send an acknowledgment of the receipt of the data to the push engine 109, as reflected by a Send Acknowledgment to Push Engine step 219.

After sending the test data or heartbeat, the push engine 109 waits to receive an acknowledgment that the data was received by the multiple client simulator 115, as reflected by a Receive ACK Before Timeout? decision step 313. If an acknowledgement is received before the timeout, the process illustrated in FIG. 3 repeats at the Receive Test Data Before Timeout? decision step 307. Otherwise, the push engine 109 disconnects the connection, as reflected by a Disconnect step 315. At the TCP/IP level, the disconnect will be communicated to the multiple client simulator. The simulator will log this disconnect.

The timeout period during which the push engine 109 waits for an acknowledgment may be in any amount. For example, a typical period may be about 50 seconds.

The processes that have been illustrated in FIGS. 2 and 3 and described above are repeated for each client that is simulated by the multiple client simulator 115. The number of these simulated clients may be specified by a user-settable parameter.

Except as otherwise indicated, the back-end systems, the push engine 109, and the multiple client simulator 115 that have been discussed are each implemented with a computer system configured to perform the functions that have been described herein for the component. Each computer system includes one or more processors, memory devices (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

Each computer system may be a personal computer, mainframe, workstation, single user system, multi-user system, server, portable computer, hand-held device, cell phone, smartphone, tablet, or part of a larger system, such a vehicle, appliance, and/or telephone system.

Each computer system may include one or more computers at the same or different locations. When at different locations, the computers may be configured to communicate with one another through a wired and/or wireless network communication system.

Each computer system may include software (e.g., one or more operating systems, device drivers, application programs, and/or communication programs). When software is included, the software includes programming instructions and may include associated data and libraries. When included, the programming instructions are configured to implement one or more algorithms that implement one more of the functions of the computer system, as recited herein. Each function that is performed by an algorithm also constitutes a description of the algorithm. The software may be stored on one or more non-transitory, tangible storage devices, such as one or more hard disk drives, CDs, DVDs, and/or flash memories. The software may be in source code and/or object code format. Associated data may be stored in any type of volatile and/or non-volatile memory.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

For example, implementations may use different operating systems, and/or multiple push engines in a clustered or non-clustered configuration. Multiple client simulators may use different operating systems. Unidirectional heart beats from the client to the push engine may in addition or instead be used.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases in a claim mean that the claim is not intended to and should not be interpreted to be limited to any of the corresponding structures, materials, or acts or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

The terms and expressions used herein have the ordinary meaning accorded to such terms and expressions in their respective areas, except where specific meanings have been set forth. Relational terms such as first and second and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by "a" or "an" does not, without further constraints, preclude the existence of additional elements of the identical type.

The Abstract is provided to help the reader quickly ascertain the nature of the technical disclosure. It is submitted with the understanding that it will not be used to interpret or limit the scope or meaning of the claims. In addition, various features in the foregoing Detailed Description are grouped together in various embodiments to streamline the disclosure. This method of disclosure is not to be interpreted as requiring that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as separately claimed subject matter.

The invention claimed is:

1. A multiple client simulator, comprising:
   a network interface system configured to:
      communicate with a push engine via long-term connections, opened and simultaneously maintained by the push engine, with multiple clients;
      receive, during a simulation of delivery of data to multiple clients, multiple instances of test data for delivery to the multiple clients from the push engine through the long-term connections; and
   a data processing system configured to:
      open and simultaneously maintain each of the long-term connections with the push engine through the network interface system, thereby simulating each of the multiple clients to the push engine; and
      log when each instance of test data is received by the network interface system, along with the identity of the connection through which the instance of test data was received,
   wherein the multiple client simulator further comprises:
      an operating system that provides at least one of:
         a default number of file descriptors that are available for assignment, wherein the available number of file descriptors has been increased beyond the default number and each connection is assigned a unique identifier, or
         a default number of ports that are available for use by application programs for communications through each IP address and the available number of ports has been increased beyond the default number, and
      when the available number of ports has been increased beyond the default number:
         each connection is assigned a unique combination of an IP address and a port, and
         the network interface system includes a virtual interface module configured to simulate multiple IP addresses from only a single host computer.

2. The multiple client simulator of claim 1 wherein:
   the push engine is configured in relation to each connection to:
      receive instances of test data from a back-end server, the instances of test data designated to be forwarded over the connection to the client that is part of the connection;
      forward each received instance of test data to the client over the connection; and
      generate and send a unique instance of test data to the client over the connection, the unique instance of test data representative of a heartbeat when no instance of test data is received from the back-end server for a pre-determined period of time; and
   the data processing system is configured to include information in the log indicative of whether a received instance of test data is a heartbeat.

3. The multiple client simulator of claim 1 wherein the data processing system is configured to cause the network interface system to send an acknowledgement to the push engine in response to the receipt of each instance of test data through the connection through which the instance of test data was received.

4. The multiple client simulator of claim 1, wherein, when the operating system provides a default number of file descriptors, each connection is assigned a unique combination of an IP address and a port.

5. The multiple client simulator of claim 4 wherein the network interface system includes a virtual interface module configured to simulate multiple IP addresses from only a single host computer.

6. The multiple client simulator of claim 1 wherein the virtual interface module is configured to simulate at least 256 IP addresses from only a single host computer.

7. The multiple client simulator of claim 5 wherein, when the operating system provides a default number of file descriptors:
   the multiple client simulator includes an operating system that provides a default number of ports that are available for use by application programs for communications through each IP address; and
   the available number of ports has been increased beyond the default number.

8. The multiple client simulator of claim 7 wherein:
   the default number of available ports is less than 35,000; and
   the available number of ports has been increased beyond 50,000.

9. The multiple client simulator of claim 7 wherein the data processing system is configured to:
   monitor which simulated IP addresses are being used for a connection; and
   to select an unused simulated IP address when opening a new connection when there are no more ports available for opening a connection with a simulated IP address that is in use.

10. The multiple client simulator of claim 1 wherein, when the operating system provides a default number of ports:
    each connection is assigned a unique file descriptor;

the multiple client simulator includes an operating system that provides a default number of file descriptors that are available for assignment; and the available number of file descriptors has been increased beyond the default number.

11. The multiple client simulator of claim 10, wherein:

the default number of file descriptors is less than 10,000; and the available number of file descriptors has been increased beyond the default number to more than 3000000.

12. The multiple client simulator of claim 1 wherein each connection is a TCP/IP connection.

13. The multiple client simulator of claim 12 wherein each connection is an HTTP or HTTPS connection and wherein each connection has a transfer coding that is set to chunked.

14. The multiple client simulator of claim 1 wherein the data processing system is configured to:

test whether each connection has been successfully established; and log when an attempted connection has not been successfully established.

15. The multiple client simulator of claim 1 wherein the data processing system is configured when opening each connection to cause authentication information to be delivered to the push engine, the authentication information indicative of the authenticity of the client that the multiple client simulator is simulating.

16. The multiple client simulator of claim 15 wherein the authentication information includes a unique mobile device number (MDN) for the client that the multiple client simulator is simulating.

17. The multiple client simulator of claim 15 wherein the authentication information includes an IP address of the client that the multiple client simulator is simulating.

18. The multiple client simulator of claim 1 wherein the data processing system is configured to compute statistical information about the performance of the push engine based on an aggregate of information that is logged therein during the simulation of delivery of data to multiple clients.

19. The multiple client simulator of claim 18 wherein the statistical information includes information about the number of connections that the push engine can simultaneously maintain.

20. The multiple client simulator of claim 18 wherein the statistical information includes information about a bandwidth of the push engine.

21. A method, comprising:

opening and simultaneously maintaining, by a data processing system via a push engine, long term connections with multiple clients, wherein each connection has a unique identifier;

communicating by a network interface system with the push engine via the opened long-term connections;

providing, by an operating system, at least one of:

a default number of file descriptors that are available for assignment, wherein the available number of file descriptors has been increased beyond the default number, or a default number of ports that are available for use by application programs for communications through each IP address and the available number of ports has been increased beyond the default number, and when the available number of ports has been increased beyond the default number:

each connection is assigned a unique combination of an IP address and a port, and the network interface system includes a virtual interface module configured to simulate multiple IP addresses from only a single host computer;

receiving, during the simulation of the delivery of data to multiple clients, multiple instances of test data for delivery to the multiple clients from the push engine through the long-term connections; and log when each instance of test data is received by the network interface system, along with the identity of the connection through which the instance of test data was received.

* * * * *